United States Patent
Seo

(10) Patent No.: US 7,561,898 B2
(45) Date of Patent: Jul. 14, 2009

(54) APPARATUS AND METHOD FOR REGISTERING WIRELESS TERMINALS WITH ACCESS POINT THROUGH WIRELESS NETWORK

(75) Inventor: Cheong-Jeong Seo, Suwon-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 587 days.

(21) Appl. No.: 11/002,196

(22) Filed: Dec. 3, 2004

(65) Prior Publication Data
US 2005/0122921 A1    Jun. 9, 2005

(30) Foreign Application Priority Data
Dec. 4, 2003    (KR) .................. 10-2003-0087778

(51) Int. Cl.
*H04M 1/00* (2006.01)
(52) U.S. Cl. .................. 455/561; 370/254; 709/220; 709/221; 709/222
(58) Field of Classification Search ............. 370/252, 370/329, 341, 431, 230, 238, 254, 255, 338, 370/310; 709/220–226, 238–242; 455/450, 455/451, 452.1, 452.2, 509, 502, 67.11, 67.12, 455/67.13, 67.14, 67.15, 67.16, 67.7, 561
See application file for complete search history.

(56) References Cited

U.S. PATENT DOCUMENTS

| | | | |
|---|---|---|---|
| 5,724,346 A | 3/1998 | Kobayashi et al. | |
| 5,991,287 A | 11/1999 | Diepstraten et al. | |
| 6,049,825 A | 4/2000 | Yamamoto | |
| 6,058,106 A | 5/2000 | Cudak et al. | |
| 6,067,297 A | 5/2000 | Beach | |
| 6,073,016 A | 6/2000 | Hulthen et al. | |
| 6,201,811 B1 | 3/2001 | Larsson et al. | |
| 6,452,915 B1 | 9/2002 | Jorgensen | |

(Continued)

FOREIGN PATENT DOCUMENTS

JP    2003224579    8/2003

(Continued)

OTHER PUBLICATIONS

Search and Examination Report for British Application No. 0426072.5; dated Apr. 13, 2005.

*Primary Examiner*—Raymond S Dean
(74) *Attorney, Agent, or Firm*—Robert E. Bushnell, Esq.

(57) ABSTRACT

In the method and apparatus for registering wireless terminals with an access point (AP) through a wireless network according to the present invention, there is no need for a re-registration procedure for terminals because, when the AP is restarted, the AP informs wireless terminals registered in its service area of the restart of the AP so as to allow each of the terminals to perform its own location registration. In addition, total update is possible, this method being in contrast to methods in which notification of a restart of the AP is carried out in a one-to-one manner using the broadcast data. As a result, efficiency in time and in the overall network is achieved by the invention. The AP can easily restore the address resolution protocol (ARP) table that has been cleared by the restart process because the terminals send the ARP table themselves, thereby providing for stabilized service.

24 Claims, 4 Drawing Sheets

U.S. PATENT DOCUMENTS

| | | |
|---|---|---|
| 6,522,654 B1 | 2/2003 | Small |
| 6,535,493 B1 | 3/2003 | Lee et al. |
| 6,594,246 B1 | 7/2003 | Jorgensen |
| 6,680,922 B1 | 1/2004 | Jorgensen |
| 6,681,259 B1 | 1/2004 | Lemiläinen et al. |
| 6,717,926 B1 | 4/2004 | Deboille et al. |
| 7,359,394 B2 * | 4/2008 | Banks et al. ............ 370/401 |
| 2004/0190477 A1 * | 9/2004 | Olson et al. ............ 370/338 |

FOREIGN PATENT DOCUMENTS

WO  PCT/US00/16424  6/2000

* cited by examiner

FIG. 4

| AP IDENTIFIER ID | AP RESTART ID |
|---|---|

APPARATUS AND METHOD FOR REGISTERING WIRELESS TERMINALS WITH ACCESS POINT THROUGH WIRELESS NETWORK

CLAIM OF PRIORITY

This application makes reference to, incorporates the same herein, and claims all benefits accruing under 35 U.S.C. §119 from an application for APPARATUS AND METHOD FOR REGISTERING WIRELESS TERMINALS WITH ACCESS POINT THROUGH WIRELESS NETWORK earlier filed in the Korean Intellectual Property Office on 4 Dec., 2003 and there duly assigned Ser. No. 2003-87778.

BACKGROUND OF THE INVENTION

1. Technical Field

The present invention relates to a method and apparatus for registering wireless terminals with an access point through a wireless network. More particularly, the present invention relates to a method and apparatus for registering wireless terminals with an access point through a wireless network in which when an access point (hereinafter, referred to as "AP") in a wireless local area network (WLAN) system is restarted, a restart situation is transmitted to the wireless terminals over a WLAN so as to allow the position registration of the wireless terminals to be easily performed, such that the AP provides a service to the terminals belonging to its service area on a stabilized basis.

2. Related Art

The term "WLAN" refers to building a network environment from a hub to respective terminals using wireless frequency or light in place of a wireless cable in an indoor or outdoor environment confined to a certain space or building such as office, downtown, home and the like. The WLAN involves a local area wireless communication technology using a wireless access protocol, such as IEEE 802.11, in an unlicensed frequency band of 2.4/5 GHz. The WLAN was originally developed as a substitute for a wired LAN cable, and has been so far used to build a small-scale wireless network environment primarily in enterprises. However, recently, the WLAN technology is being newly highlighted as a public network technology that provides broadband wireless Internet access service to service subscribers out of an original limitation of being evolved from the wired LAN technology.

The WLAN is composed of a collection of stations called Basic Service Sets (BSSs). Basically, the term "BSS" encompasses both an independent BSS and an infrastructure BSS. In this regard, a "station" is an entity for making a connection using a wireless medium. An example of a station includes a Network Interface Card (NIC) mounted on a personal computer (PC) or a notebook computer.

In the independent BSS, communication between stations is made over a limited distance without using an access point (AP). That is, communication between terminals is accomplished by building an ad hoc network in a state where the terminals are not connected to a wired network, such as a LAN. In the WLAN, information as to how the terminals discover each other, how the terminals synchronize with a timer, and how the terminals maintain battery power is provided.

The infrastructure BSS involves a structure in which each BSS includes one AP connected to the wired network. The AP registers a terminal with the BSS, authenticates the terminal, and performs processing on roaming and mobility of a station. Further, the AP includes additional functions, such as firewall, NATs, DHCP server/client, VPN, and the like.

In the BSS mode, the AP serves as a connection point with respect to the wired network. Under a general premise environment, only one AP is present for several terminals. Since the 802.11 standard supports Intra-BSS mobility, the wireless terminal can accept the same service regardless of its position only if the wireless terminal moves within the AP area.

Further, several BSSs connected by a backbone network can cover a more extended area. Such a backbone network, connected with the BSSs, is called a Distributed System (DS). In this regard, the respective BSSs are discriminated by a 48-bit BSS identifier (ID) which is similar to a MAC address in the 802.3 type LAN. Building the distributed system at places such as a campus or a conference center can provide WLAN service in a broader area.

When the wireless terminals roam from one BSS to another BSS, the DS allows a user to freely roam and receive a packet at a new position. Although the DS may be configured for any form of network, it generally uses an 802.3 type LAN. A form in which two or more BSSs are connected to the DS so as to build one sub-network is called an Extended Service Set (ESS).

Respective ESSs are discriminated by an ESS ID. Wireless terminals always belong to a particular BSS and ESS. When the wireless terminals move from one BSS (BSS-A) to another BSS (BSS-B), both of which belong to the same ESS, packets must be properly routed to the moving terminals. The APs in the respective BSS-A and BSS-B are responsible for the routing function. The APs route the packets to other terminals in the BSS or in another BSS in the same ESS. The wireless terminal may include a note PC, a smart card, a VoIP phone, or the like, capable of performing WLAN voice/data communication.

As a result, the APs are entities that connect between a wireless medium and a wired network, such as an 802.3 type network. The AP becomes a base station for a WLAN device, and serves to connect the device with a wired network, such as a LAN.

In this WLAN system, the APs will perform a restart when power is down, when a network interface card (NIC) stage is dead due to network traffic loads, other attacks or the like, or when a bug exists in software. When the APs are restarted, an entire address resolution protocol (ARP) table for all wireless terminals registered in the service area of the APs is cleared. Accordingly, the APs cannot recognize which of the terminals are currently registered with the APs because the media access control (MAC) list of the wireless terminals reserved by the APs is deleted when the APs are restarted. In addition, because the terminals do not recognize that the APs have performed the restart, a situation such as a connection failure or the like will arise.

The ARP table for the wireless terminals registered with the AP will be described briefly.

The address resolution protocol (ARP) is a protocol used when the AP desires to know the MAC address of a wireless terminal in the situation wherein the AP is aware of an IP address of the wireless terminal. Conversely, a reverse ARP (RARP) is a protocol used when the AP desires to know an IP address using the MAC address of the wireless terminal.

A process of determining a MAC address using an ARP will be described briefly. The MAC address of a wireless terminal is needed in order to communicate with the wireless terminal in a WLAN interval.

The MAC address has a unique value of 6 bytes per each NIC (i.e., LAN card). To determine the MAC address, the AP transmits an ARP packet containing the IP address of the wireless terminal to the wireless terminal over the WLAN in a broadcast communication in a manner distinguishable from the prior art Each NIC of each wireless terminal connected to the WLAN receives this packet, and causes a central processing unit (CPU) in the terminal to analyze the packet. The NIC compares the IP address in the packet to its IP address. If the two addresses do not match, the NIC ignores the packet; if two addresses do match, the NIC transmits the packet containing the MAC address of the NIC to the AP.

Using the MAC address of the wireless terminals determined through such a process, the AP transmits a packet having desired data containing the address to perform unicast communication.

Furthermore, the AP periodically sends beacon data to the wireless terminal. Because a note-PC, a general desktop PC, or the like is not influenced by power consumption as a result of using a large capacity battery, the PC sets up a link to the AP suitable for a relevant area using periodically received beacon data to accomplish resuming of the link until the link to the AP is re-established after the link to the AP is dropped. At this time, the PC of course must use a mechanism in which the ARP is reconfigured by resetting its relevant information.

However, in contrast to the above case, due to power consumption considerations, the voice wireless terminal is not permitted to have a polling structure by means of which the periodically received beacon is checked. Attempting polling when a link is dropped causes power consumption several times greater than the power consumption in a normal standby mode, and this greatly influences standby mode time.

Substantially, there is a frequent occurrence of the case wherein the voice wireless terminal cannot reset itself due to a difference in a scanning time or the like, and this is in contrast to a data terminal such as a note-PC or the like. Accordingly, the AP is not obligated to process signaling for a terminal in which resumed setup is not carried out, and the AP cannot confirm whether the relevant voice wireless terminal belongs to the AP.

As a result, conventionally, when the AP is restarted, the MAC list for all wireless terminals is initialized. Accordingly, even though a wireless terminal transmits signaling, the AP cannot recognize it. The reason is that the ARP table in the AP can perform signal processing only for terminals registered with the AP.

Furthermore, there are problems in that the wireless terminal cannot at all recognize whether the AP has performed a restart, and the AP cannot confirm whether there are wireless terminals connected to the AP, which causes connection failure or the like.

The following patents are considered to be generally pertinent to the present invention, but are burdened by the disadvantages set forth above: U.S. Pat. No. 6,680,922 to Jorgensen, entitled METHOD FOR THE RECOGNITION AND OPERATION OF VIRTUAL PRIVATE NETWORKS (VPNS) OVER A WIRELESS POINT TO MULTI-POINT (PTMP) TRANSMISSION SYSTEM, issued on Jan. 20, 2004; U.S. Pat. No. 6,594,246 to Jorgensen, entitled IP-FLOW IDENTIFICATION IN A WIRELESS POINT TO MULTI-POINT TRANSMISSION SYSTEM, issued on Jul. 15, 2003; U.S. Pat. No. 6,452,915 to Jorgensen, entitled IP-FLOW CLASSIFICATION IN A WIRELESS POINT TO MULTI-POINT (PTMP) TRANSMISSION SYSTEM, issued on Sep. 17, 2002; U.S. Pat. No. 6,058,106 to Cudak et al., entitled NETWORK PROTOCOL METHOD, ACCESS POINT DEVICE AND PERIPHERAL DEVICES FOR PROVIDING FOR AN EFFICIENT CENTRALLY COORDINATED PEER-TO-PEER WIRELESS COMMUNICATIONS NETWORK, issued on May 2, 2000; U.S. Pat. No. 6,535,493 to Lee et al., entitled MOBILE INTERNET COMMUNICATION PROTOCOL, issued on Mar. 18, 2003; U.S. Pat. No. 6,073,016 to Hulthen et al., entitled MOBILE DEVICE ID ALLOCATION SYSTEM AND METHOD, issued on Jun. 6, 2000; U.S. Pat. No. 6,717,926 to Deboille et al., entitled APPARATUS AND ASSOCIATED METHOD, BY WHICH TO TRANSMIT BEACON SIGNALS IN A RADIO COMMUNICATION SYSTEM, issued on Apr. 6, 2004; U.S. Pat. No. 6,201,811 to Larsson et al., entitled TRANSFERRING IDENTIFIER INFORMATION IN A TELECOMMUNICATION SYSTEM, issued on Mar. 13, 2001; U.S. Pat. No. 5,991,287 to Diepstraten et al., entitled SYSTEM AND METHOD FOR PROVIDING SEAMLESS HANDOVER IN A WIRELESS COMPUTER NETWORK, issued on Nov. 23, 1999; U.S. Pat. No. 5,724,346 to Kobayashi et al., entitled MEANS FOR MAINTAINING CONNECTABLE ACCESS POINTS OWING TO MOVEMENT OF A MOBILE STATION BETWEEN CELLS IN A WIRELESS LAN SYSTEM, issued on Mar. 3, 1998; U.S. Pat. No. 6,681,259 to Lemilainen et al., entitled METHOD FOR COUPLING A WIRELESS TERMINAL TO A DATA TRANSMISSION NETWORK AND A WIRELESS TERMINAL, issued on Jan. 20, 2004; and U.S. Pat. No. 6,067,297 to Beach, entitled EMBEDDED ACCESS POINT SUPPORTING COMMUNICATION WITH MOBILE UNIT OPERATING IN POWER-SAVING MODE, issued on May 23, 2000.

SUMMARY OF THE INVENTION

It is, therefore, an object of the present invention to provide a method and apparatus for registering wireless terminals with an access point (AP) through a wireless network. In accordance with the invention, when the AP is restarted, the AP informs wireless terminals registered in its service area that the AP has been restarted so as to allow the terminals to register their respective locations. In this way, errors such as connection failure or the like can be prevented. Moreover, even when the AP is abnormal, the AP can usually provide normal service to the wireless terminals belonging to its service area after the AP is restored, thereby providing operation on a stabilized basis.

According to an aspect of the present invention, there is provided a method for rebuilding a wireless terminal address resolution protocol (ARP) table of an access point using a wireless network. The method comprises the steps of: when the access point is restarted, transmitting a restart generation notification message as broadcast data to wireless terminals over the wireless network; and rebuilding the ARP table using ARP registration information transmitted from at least one wireless terminal, which receives the restart generation notification message and belongs to a service area of the access point.

The restart generation notification message includes identifier information and restart information relating to the access point.

The identifier information of the access point includes at least one of MAC address information, BSS ID information, and ESS ID information of the access point.

Rebuilding the ARP table includes: transmitting a join response signal over the wireless network when a join request signal is received from the "at least one wireless terminal"; transmitting a probe response signal to the terminals receiving the join response signal over the wireless network when a probe request signal is received from the terminals; transmitting a MAC confirmation response signal to the terminals receiving the probe response signal when a MAC confirmation signal is received from the terminals; and, when an association request signal is received from the terminals receiving the MAC confirmation response signal, transmitting an association response signal in response to the association request signal, and then building the address resolution protocol (ARP) table for the "at least one terminal".

The "at least one wireless terminal" includes at least one of a voice terminal, a data terminal, and a voice/data terminal capable of performing wireless network communication.

A restart generation notification message may be added to a beacon signal and transmitted, the beacon being periodically transmitted to the "at least one wireless terminal". The wireless network includes a WLAN.

According to another aspect of the present invention, there is provided a method for rebuilding a wireless terminal address resolution protocol (ARP) table of an access point using a wireless network, the method comprising the step of: when the access point is restarted, transmitting a restart generation notification message as broadcast data to wireless terminals over the wireless network; receiving, at the wireless terminal, the restart generation notification message transmitted as broadcast data from the access point over the wireless network, and comparing MAC information of the access point included in the received restart generation notification message to MAC information of an access point to which the wireless terminal belongs; transmitting registration information for ARP registration to the access point over the wireless network when the MAC information transmitted from the access point and the MAC information held by the wireless terminal match each other as a result of the comparison; and building the ARP table for at least one wireless terminal included in a service area of the access point based on the registration information for the wireless terminal transmitted from the wireless terminal.

According to yet another aspect of the present invention, there is provided a method for detecting a restart of an access point using a wireless network, the method comprising the steps of: receiving a restart generation notification message transmitted as broadcast data from the access point over the wireless network; comparing MAC information of the access point contained in the received restart generation notification message to MAC information of an access point to which a wireless terminal belongs; and performing a scanning operation for address resolution protocol (ARP) registration with the access point using the wireless network when the MAC information transmitted from the access point and the MAC information held by the wireless terminal match each other as a result of the comparison.

The step of performing the scanning operation includes: transmitting a join request signal to the access point over the wireless network; transmitting a probe request signal to the access point when a response signal is received from the access point over the wireless network in response to the join request signal; transmitting a MAC confirmation request signal to the access point when a response signal in response to the probe request signal is received from the access point; and, when the MAC confirmation response signal in response to the MAC confirmation request signal is received from the access point, transmitting an association request signal to the access point, and receiving a response signal in response to the association request signal.

According to yet another aspect of the present invention, there is provided an apparatus for rebuilding a wireless terminal ARP table of an access point using a wireless network, the apparatus comprising: a data generator for generating broadcast data in response to a provided data generation control signal when the access point is restarted, the broadcast data containing a restart generation notification message of the access point; a transceiver for (a) transmitting the broadcast data to wireless terminals over the wireless network, the broadcast data containing the restart generation notification message generated by the data generator, and (b) receiving terminal registration information transmitted from at least one terminal, which receives the restart generation notification message and belongs to the service area of the access point; and a controller for building the ARP table using the registration information for the wireless terminals received via the transceiver.

The transceiver performs the following functions: (a) it transmits a join response signal to the "at least one wireless terminal" over the wireless network when a join request signal is received from the wireless terminal; (b) it transmits the probe response signal to the terminals receiving the join response signal over the wireless network when a probe request signal is received from the terminals; (c) it transmits a MAC confirmation response signal to the terminals receiving the probe response signal when a MAC confirmation signal is received from the terminals; and (d) it transmits an association response signal in response to an association request signal when the association request signal is received from the terminals receiving the MAC confirmation response signal, and then it provides the registration information for the "at least one wireless terminal" to the controller.

According to yet another aspect of the present invention, there is provided, in a wireless terminal connected to an access point over a wireless network, an apparatus for detecting a restart of the access point, the apparatus comprising: a controller for comparing and analyzing MAC information of the access point contained in a received restart generation notification message to MAC information of the access point reserved by the controller when the restart generation notification message is transmitted as broadcast data from the access point over the wireless network and is received; and a transceiver for receiving the restart generation notification message transmitted as broadcast data from the access point, and for transmitting terminal registration information for ARP registration to the access point over the wireless network when the MAC information received from the access point and the MAC information reserved by the controller match each other as a result of comparing the MAC information at the controller.

The transceiver performs the following operations: (a) it transmits a join request signal to the access point over the wireless network; (b) it transmits a probe request signal to the access point when a response signal in response to the join request signal from the access point over the wireless network is received; (c) it transmits a MAC confirmation request signal to the access point when a response signal in response to the probe request signal from the access point is received; and (d) it transmits an association request signal to the access point and receives a response signal in response the association request signal when a MAC confirmation response signal is received from the access point in response to the MAC confirmation request.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein:

FIG. 4 is a diagram of the configuration of a broadcasting data format for informing a wireless terminal of a restart situation when an access point (AP) is restarted according to the present invention.

DETAILED DESCRIPTION OF THE INVENTION

Hereinafter, a method and apparatus for registering wireless terminals with an access point (AP) through a wireless network according to exemplary embodiments of the present invention will be described in detail with reference to the accompanying drawings.

Figure 1:
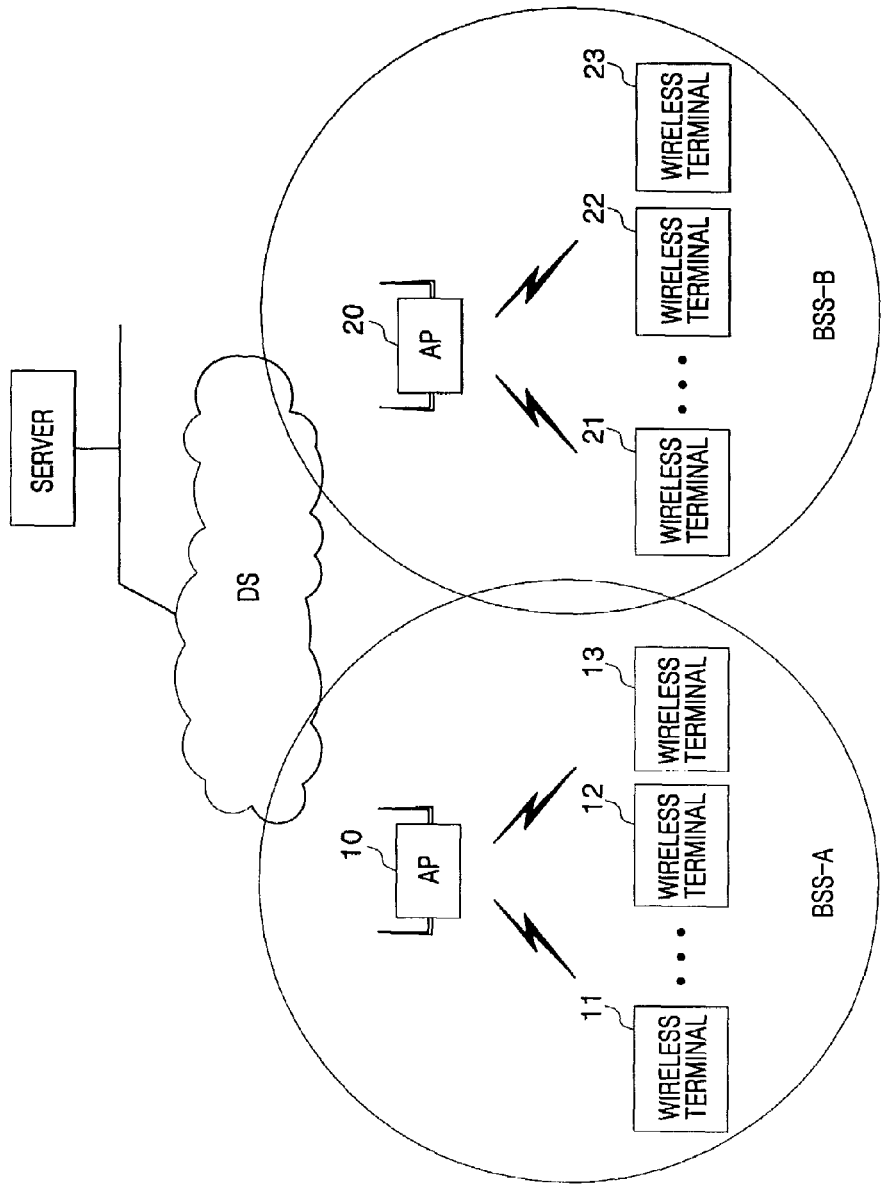
FIG. 1 is a diagram of the configuration of a general wireless LAN system.

FIG. 1 is a diagram of the configuration of a general wireless LAN system.

As shown in FIG. 1, several BSSs connected by a backbone network can cover a more extended area. Such a backbone network, connected with the BSSs, is called a Distributed System (DS). In this regard, the respective BSSs are discriminated by a 48-bit BSS ID which is similar to a MAC address in the 802.3 type LAN. Building the distributed system at places such as a campus or a conference center can provide WLAN service in a broader area. FIG. 1 is a diagram of the network connection configuration of a general WLAN system using a backbone network.

As shown in FIG. 1, when the wireless terminals 11, 12, 13, 21, 22 and 23 roam from one BSS (BSS-A) to another BSS (BSS-B), the DS allows a user to freely roam and receive a packet at a new position. Although the DS may be configured for any form of network, it generally uses an 802.3 type LAN. A form in which two or more BSSs are connected to the DS so as to build one sub-network is called an Extended Service Set (ESS).

Respective ESSs are discriminated by an ESS ID. Wireless terminals 11, 12, 13, 21, 22 and 23 always belong to a particular BSS and ESS. When the wireless terminals 11, 12, 13, 21, 22 and 23 move from one BSS (BSS-A) to another BSS (BSS-B), both of which belong to the same ESS, packets must be properly routed to the moving terminals 11, 12, 13, 21, 22 and 23. The APs 10 and 20 in the respective BSS-A and BSS-B are responsible for the routing function. The APs 10 and 20 route the packets to other terminals 11, 12, 13, 21, 22 and 23 in the BSS or in another BSS in the same ESS. The wireless terminal may include a note PC, a smart card, a VoIP phone, or the like, capable of performing WLAN voice/data communication.

As a result, the APs 10 and 20 are entities that connect between a wireless medium and a wired network, such as an 802.3 type network. The AP becomes a base station for a WLAN device, and serves to connect the device with a wired network, such as a LAN.

In this WLAN system, the APs 10 and 20 will perform a restart when power is down, when a network interface card (NIC) stage is dead due to network traffic loads, other attacks or the like, or when a bug exists in software. When the APs 10 and 20 are restarted, an entire address resolution protocol (ARP) table for all wireless terminals registered in the service area of the APs 10 and 20 is cleared. Accordingly, the APs 10 and 20 cannot recognize which of the terminals are currently registered with the APs because the media access control (MAC) list of the wireless terminals reserved by the APs is deleted when the APs are restarted. In addition, because the terminals do not recognize that the APs have performed the restart, a situation such as a connection failure or the like will arise.

Figure 2:
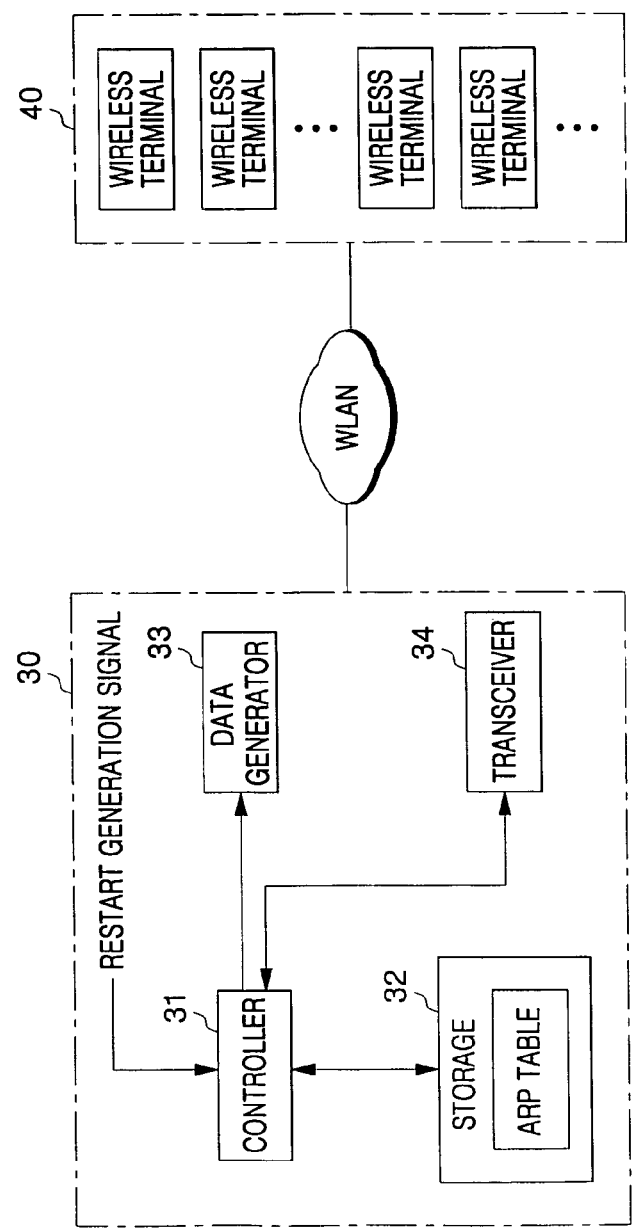
FIG. 2 is a block diagram of the configuration of an apparatus for registering wireless terminals with an access point (AP) through a wireless network according to the present invention.

FIG. 2 is a block diagram of the configuration of an apparatus for registering wireless terminals with an access point (AP) through a wireless network according to the present invention.

As shown in FIG. 2, an AP 30 is composed of a controller 31, a storage 32, a data generator 33, and a transceiver 34. The storage 32 includes an ARP table that stores a MAC list of wireless terminals 40 registered in a service area of the AP 30.

When the AP 30 is powered down, or when a network interface card (NIC) stage is dead due to network traffic loads, other attacks or so forth, a resulting bug occurs in the software. Accordingly, the AP 30 has to be restarted. At this time, the controller 31 provides the data generator 33 with a broadcasting data generation request signal so as to inform the wireless terminals 40 of restart generation in the AP 30. In this case, MAC list information for the wireless terminals 40, which has been stored in the ARP table in the storage 32, is entirely cleared.

The data generator 33 forms broadcasting data for informing the wireless terminals 40 of the AP restart generation in response to the broadcasting data generation request signal received from the controller 31, and then provides the broadcasting data to the transceiver 34. The broadcasting data includes MAC address information and restart generation ID information of the AP 30.

The transceiver 34 transmits the broadcasting data generated by the data generator 33 to the wireless terminals 40 over a wireless network (WLAN).

Each of the wireless terminals 40, which has received the broadcasting data transmitted from the transceiver 34 over the WLAN, analyzes the AP MAC address information contained in the broadcasting data, and compares the AP MAC address information to AP MAC address information held by it to see whether the two sets of information match each other. A wireless terminal 40 having a matching AP MAC address transmits and receives scanning information to and from the transceiver 34 of the AP 30. If the AP MAC address information contained in the received broadcasting data does not match to the AP MAC address information held by a wireless terminal, that wireless terminal determines that the AP is an AP where it is not registered, and ignores the received broadcasting data.

The transceiver 34 recognizes the MAC addresses of the terminals based upon the scanning information transmitted and received to and from the wireless terminals 40, and rebuilds or updates a MAC list of the wireless terminals 40 in the ARP table of the storage 32. The operation of transmitting and receiving the scanning information between the transceiver 34 of the AP 30 and the wireless terminal(s) 40 will be described below. A method for registering wireless terminals according to the present invention, which corresponds to the operation of an apparatus for registering wireless terminals upon restart of the AP according to the present invention, will be discussed step by step with reference to the accompanying FIGS. 3 and 4.

Figure 3:
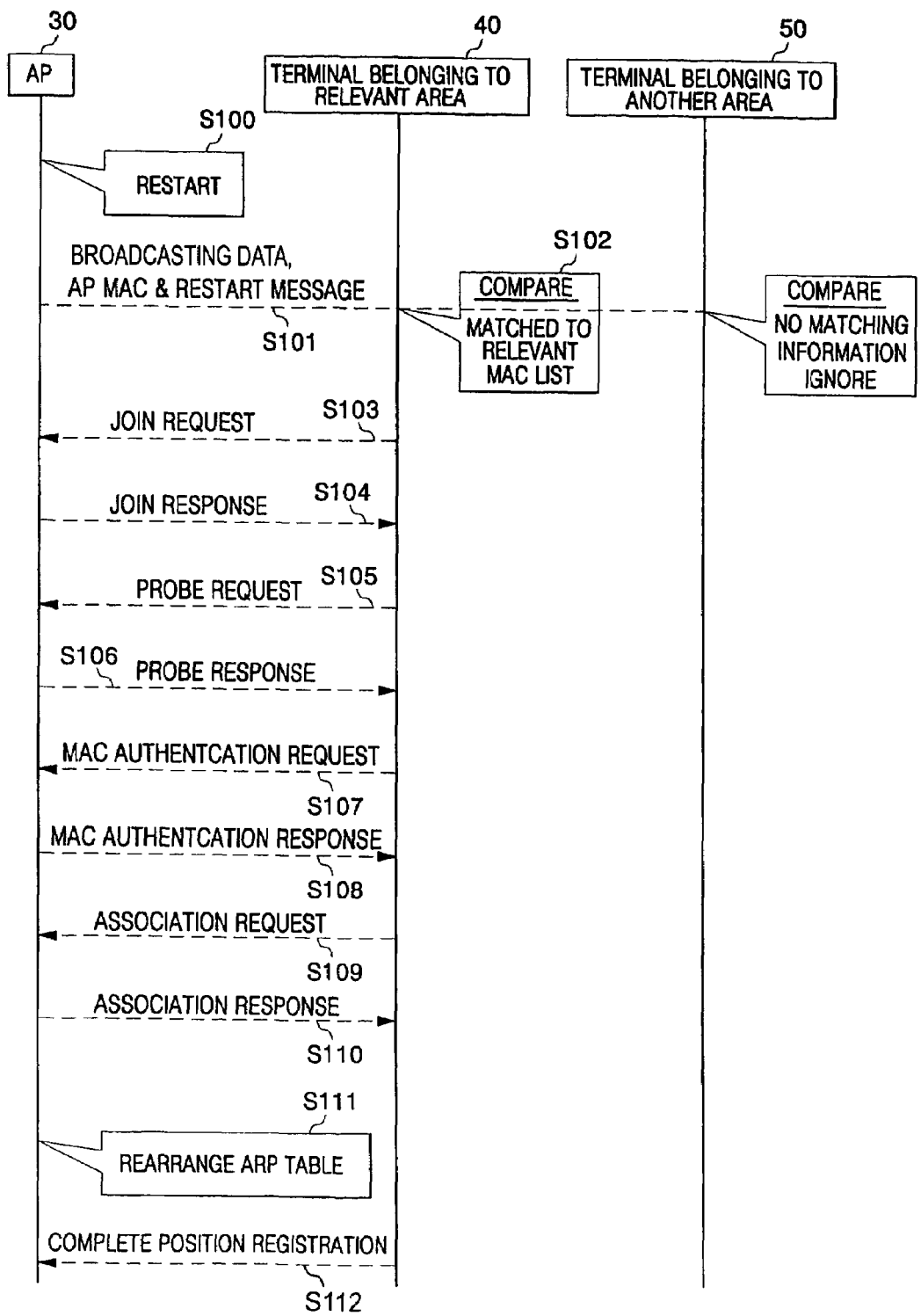
FIG. 3 is a data flow diagram showing a procedure for registering wireless terminals with an access point (AP) through a wireless network according to the present invention.
Figure 4:
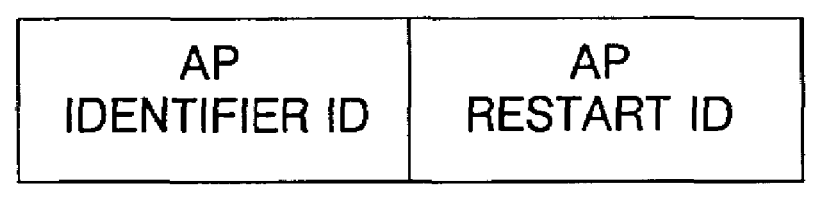

FIG. 3 is a data flow diagram showing a procedure for registering wireless terminals with an access point (AP) through a wireless network according to the present invention, and FIG. 4 is a diagram of the configuration of a broadcasting data format for informing a wireless terminal of a restart situation when an AP is restarted according to the present invention.

First, when the AP 30 is powered down, or when a network interface card (NIC) stage is dead due to network traffic loads, other attacks or so forth, a resulting bug occurs in the software within the AP 30. Accordingly, the AP 30 has to be restarted.

At the stage where the AP 30 is restarted and all operations are initialized, the AP 30 performs a broadcasting operation with respect to all wireless terminals 40 and 50. At this point, the AP 30 delivers its MAC ID information and restart generation message ID upon broadcasting.

The broadcasting data is transmitted to an overall network connected physically, and terminals positioned within the network service range receive the broadcasting data transmitted by the AP 30. The wireless terminals 40 and 50 positioned in all areas, rather than only the wireless terminals 40 present in a service area of the relevant AP 30, receive the broadcasting data.

In this case, a load problem can be solved by the following method. Even though the AP 30 is restarted, the wireless terminals 40 and 50 do not recognize the restart, but the wireless terminals 40 and 50 also have a Mac list of the relevant AP 30 in an ARP table.

Accordingly, as described above, if the AP 30 adds the Mac list of the AP 30 and a message field indicating a new restart to the broadcasting data, and then transmits it, all of the wireless terminals 40 and 50 compare the MAC addresses of the AP 30 currently held by the wireless terminals 40 and 50, such that only the wireless terminals 40 in a relevant area recognize that the AP 30 has been restarted.

At this point, the terminals 40 newly transmit a join request to the AP 30, and accordingly the AP 30 can restore the MAC list for the wireless terminals 40 that have been present in its service area, such that the AP 30 newly rebuilds an ARP table and resumes the WLAN service.

When receiving the broadcasting data, wireless terminals 50 in other areas not related to the service area of the relevant AP 30 ignore the broadcasting data because the received MAC address of the AP 30 and Mac address of the AP 30 reserved by the wireless terminals 50 do not match each other. This makes it possible to implement the above-described method without imposing a heavy load on the overall network while not adversely influencing the service area of another AP 30.

The description in the above-described embodiment has been made by way of an exemplary message format notifying that the AP 30 has been restarted, in which format an arbitrary field is added to the broadcasting data, and the identifier information and restart notification information of the AP 30 are loaded and transmitted on the added field. However, another method is available, in which method the restart notification information of the AP is carried and transmitted on a reserved field of a beacon signal which is periodically transmitted from the AP to the wireless terminals. Only restart notification information is carried and transmitted on the reserved field because the MAC address information of a relevant AP is included in the beacon signal. In this case, the identifier information of the AP may include at least one of MAC address information, Extended Service Set (ESS) ID information, and Basic Service Set (BSS) ID information.

Furthermore, when the AP is restarted, it is possible to form a separate message format for notifying of the restart of the AP. That is, when the restart of the AP is generated, the message format may be configured so as to be transmitted to the wireless terminals regardless of the beacon signal and the broadcasting data.

This operation will be described in more detail with reference to FIGS. 3 and 4.

First, when the AP 30 is powered down, or when a network interface card (NIC) stage is dead due to network traffic loads, other attacks or so forth, a resulting bug occurs in the software within the AP 30. Accordingly, the AP 30 is restarted (S100). At this point, the AP 30 loads its AP identifier information and the restart information on general broadcasting data, and transmits it to all wireless terminals 40 and 50 in the network (S101). That is, the AP 30 transmits the broadcasting data even to terminals 50 belonging to the service area of other APs, in addition to the wireless terminals 40 belonging to the service area of the restarted AP 30. The identifier information of the AP 30 includes at least one of MAC address information, Extended Service Set (ESS) ID and Basic Service Set (BSS) ID information of the AP. The wireless terminal may include a note PC, a desktop PC, a smart card, or a VoIP phone, or the like, capable of performing WLAN voice/data communication.

The AP identifier information and restart information transmitted to the respective wireless terminals 40 and 50 when the AP 30 is restarted may be transmitted by adding an arbitrary field to the broadcasting data and loading the information on the added field, as described above. Alternatively, another method is available, in which method the restart notification information for the AP 30 is loaded and transmitted on a reserved field of a beacon signal periodically transmitted to the wireless terminals 40 and 50 by the AP 30. At this point, only restart notification information is loaded and transmitted on the reserved field because the MAC address information of the relevant AP 30 is included in the beacon signal.

Furthermore, when the AP 30 is restarted, it is possible to form a separate message format for notifying the restart of the AP 30. That is, when the restart of the AP 30 is generated, the message format is configured so as to be transmitted to the wireless terminals 40 and 50 regardless of the beacon signal and the broadcasting data.

All terminals 40 and 50 (in the relevant area and other areas) which receive the broadcasting data, including the AP identifier information and restart information transmitted by the AP 30, compare the identifier information of the AP 30 included in the received broadcasting data (e.g., MAC address information) to AP MAC address information reserved by the terminals (S102).

If the MAC address of the AP received from the AP 30 and the MAC address of the AP reserved by the terminals do not match each other as a result of the comparison, the terminals 50 determine that the AP 30 transmitting the broadcasting data is not an AP in an area where the terminals 50 are served, and they ignore the received broadcasting data.

However, if the MAC address of the AP 30 received from the AP 30 and the MAC address of the AP reserved by the terminals 40 do match each other, the terminals 40 determine that the AP 30 transmitting the broadcasting data is an AP where the terminals 40 are served, and recognize that the relevant AP 30 has been restarted.

The wireless terminals 40 belonging to the service area of the restarted AP 30 perform the following scanning operation. Here, a general scanning operation will be described.

The scanning is needed for the wireless terminal 40 to discover and join a cell in which the wireless terminal 40 is included, and to discover a new AP when roaming is generated. Further, it is an operation required to initialize an ad hoc network, such as an independent BSS.

Scanning modes are classified into a passive scanning mode and an active scanning mode. The passive scanning mode is a scheme in which wireless terminals monitor all channels to determine which cell to join. On the other hand, the active scanning mode is a scheme in which the wireless terminals discover a desired cell by sending a probe request signal to all channels. In the active scanning mode, the wireless terminals broadcast the probe request signal and then wait to receive a probe response signal from the AP.

The wireless terminal which has received the probe response signal from several APs selects an optimum AP of the APs, and transmits an association (communication path) request signal to the AP to establish connection thereto.

That is, if the wireless terminal first sends the probe request signals to APs in the vicinity of the wireless terminal, respective APs transmit responses to the terminal. The wireless terminal selects an optimum AP based on the received responses, and then transmits the association request signal to the relevant AP. Then, the AP transmits an association response signal to the wireless terminal, and completes the active scanning process.

That is, as shown in FIG. 3, the wireless terminals 40 belonging to the service area of the AP 30 receive a restart message from the restarted AP 30, and then transmit a join request signal to the AP 30 (S103).

The AP 30 transmits a join response signal, corresponding to the join request signal received from the wireless terminals 40, to the respective wireless terminals 40 (S104).

Each of the wireless terminals 40 transmits a probe request signal to the AP 30 in response to the join response signal received from the AP 30 (S105). The probe request signal is a request signal sent for the purpose of determining that data can be received from the AP 30.

The AP 30 transmits a probe response signal to each of the wireless terminals 40 in response to the probe request signal transmitted from each of the wireless terminals 40 (S106).

The wireless terminals 40 that have received the probe response signal from the AP 30 transmit a MAC authentication request signal for the AP 30 to the AP 30 (S107), and the AP 30 transmits a MAC authentication response signal to the respective wireless terminals 40 (S108).

The wireless terminals 40 receiving the MAC authentication response signal transmit an association request signal to the AP 30 so as to establish a communication channel with the AP 30 (S109), and the AP 30 transmits an association response signal to the wireless terminals 40 in response to the association request signal received from the wireless terminals 40, such that the AP 30 rebuilds its ARP table and completes position registration of all wireless terminals 40 positioned in its service area (S110, S111 and S112). As a result, the above-described steps S103 to S112 are performed according to an 802.11b standard procedure defined by the Institute of Electrical and Electronic Engineers (IEEE).

Although the above-described embodiments have been described in conjunction with the WLAN, it will be appreciated by those skilled in the art that the present invention is equally applicable to other wireless networks, and also that the above-described wireless terminal may include all terminals capable of performing voice, data, and voice/data communication. The rights analysis or scope of the present invention should be construed by the appended claims.

The above-described method and apparatus for registering wireless terminals with an access point (AP) through a wireless network according to the present invention have the advantage of precluding any need for a re-registration procedure for terminals because, when the AP 30 is restarted, the AP 30 informs wireless terminals 40 registered in its service area of the restart of the AP 30 so as to allow each of the terminals 40 to perform its location registration. The present invention also has a significant advantage in the area of power consumption because, when the AP is restarted, it is a situation wherein it is generally needed for a re-registration procedure by powering the terminal off and then on.

In addition, a total update is possible, in contrast to methods in which notification of the restart situation of the AP is carried out in a one-to-one manner using the broadcast data. As a result, efficiency in time and in the overall network is achieved by the invention.

Furthermore, the AP 30 can easily restore the ARP table that has been cleared by the restart because the terminals 40 send the ARP table themselves, thereby providing for stabilized service.

Although preferred embodiments of the present invention have been described, it will be understood by those skilled in the art that the present invention should not be limited to the described preferred embodiments. Rather, various changes and modifications can be made within the spirit and scope of the present invention, as defined by the following claims.

What is claimed is:

1. A method for rebuilding a wireless terminal address resolution protocol table of an access point using a wireless network, the method comprising the steps of:
   when the access point is restarted, transmitting a restart generation notification message as broadcast data to wireless terminals over the wireless network; and
   rebuilding the address resolution protocol table using address resolution protocol registration information transmitted from at least one wireless terminal which receives the restart generation notification message and belongs to a service area of the access point;
   wherein the restart generation notification message is added to a beacon signal and transmitted, the beacon signal being periodically transmitted to said at least one wireless terminal.

2. The method of claim 1, wherein the restart generation notification message includes identifier information and restart information of the access point.

3. The method of claim 2, wherein the identifier information of the access point includes at least one of medium access control address information, Basic Service Set identifier information, and Extended Service Set identifier information of the access point.

4. The method of claim 1, wherein rebuilding the address resolution protocol table includes the steps of:
   transmitting a join response signal over the wireless network when a join request signal is received from said at least one wireless terminal;
   transmitting a probe response signal to terminals receiving the join response signal over the wireless network when a probe request signal is received from the terminals;
   transmitting a medium access control authentication response signal to the terminals receiving the probe response signal when a medium access control authentication signal is received from the terminals; and
   when an association request signal is received from the terminals receiving the medium access control confirmation response signal, transmitting an association response signal in response to the association request signal, and then building the address resolution protocol table for said at least one wireless terminal.

5. The method of claim 1, wherein said at least one wireless terminal includes at least one of a voice terminal, a data terminal, and a voice/data terminal capable of performing wireless network communication.

6. The method of claim 1, wherein the wireless network comprises a wireless local area network (WLAN).

7. A method for detecting a restart of an access point using a wireless network, the method comprising the steps of:
- receiving a restart generation notification message transmitted as broadcast data from the access point over the wireless network;
- comparing medium access control information of the access point contained in the received restart generation notification message to medium access control information held by a wireless terminal and corresponding to an access point to which the wireless terminal belongs; and
- performing a scanning operation for address resolution protocol registration with the access point using the wireless network when the medium access control information transmitted from the access point and the medium access control information held by the wireless terminal match each other as a result of the comparison.

8. The method of claim 7, wherein the restart generation notification message transmitted from the access point includes identifier information and restart information of the access point.

9. The method of claim 8, wherein the identifier information of the access point includes at least one of medium access control address information, Basic Service Set identifier information, and Extended Service Set identifier information of the access point.

10. The method of claim 7, wherein performing the scanning operation includes the steps of:
- transmitting a join request signal to the access point over the wireless network;
- transmitting a probe request signal to the access point when a response signal in response to the join request signal is received from the access point over the wireless network;
- transmitting a medium access control authentication request signal to the access point when a response signal in response to the probe request signal is received from the access point; and
- when a medium access control authentication response signal in response to the medium access control authentication request signal is received from the access point, transmitting an association request signal to the access point and receiving a response signal in response to the association request signal.

11. The method of claim 7, wherein the restart generation notification message transmitted from the access point over the wireless network is included in a beacon signal periodically transmitted from the access point.

12. A method for rebuilding a wireless terminal address resolution protocol (ARP) table of an access point using a wireless network, the method comprising the steps of:
- when the access point is restarted, transmitting a restart generation notification message as broadcast data to wireless terminals over the wireless network;
- receiving, at a wireless terminal, the restart generation notification message transmitted as broadcast data from the access point over the wireless network, and comparing medium access control information of the access point included in the received restart generation notification message to medium access control information held by the wireless terminal and corresponding to an access point to which the wireless terminal belongs;
- transmitting registration information for ARP registration from the wireless terminal to the access point over the wireless network when the medium access control information transmitted from the access point and the medium access control information held by the wireless terminal match each other as a result of the comparison; and
- building the address resolution protocol table for at least one wireless terminal belonging to a service area of the access point based on the registration information from the wireless terminal to the access point.

13. The method of claim 12, wherein the restart generation notification message transmitted as the broadcast data from the access point to the wireless terminal includes identifier information and restart information of the access point.

14. The method of claim 13, wherein the identifier information of the access point includes at least one of medium access control address information, Basic Service Set identifier information, and Extended Service Set identifier information of the access point.

15. The method of claim 12, wherein the restart generation notification message transmitted from the access point to the wireless terminal over the wireless network is included in a beacon signal and transmitted, the beacon signal being periodically transmitted from the access point to the wireless terminals.

16. An apparatus for rebuilding a wireless terminal address resolution protocol table of an access point using a wireless network, said apparatus comprising:
- a data generator for generating broadcast data in response to a provided data generation control signal when the access point is restarted, the broadcast data containing a restart generation notification message of the access point;
- a transceiver for transmitting the broadcast data to wireless terminals over the wireless network, the broadcast data containing the restart generation notification message generated by said data generator, and for receiving terminal registration information transmitted from at least one wireless terminal which receives the restart generation notification message and belongs to a service area of the access point; and
- a controller for building the address resolution protocol table using the terminal registration information for the wireless terminals received via said transceiver;
- wherein the restart generation notification message is added to a beacon signal and transmitted, the beacon signal being transmitted periodically to said at least one wireless terminal.

17. The apparatus of claim 16, wherein the restart generation notification message in the broadcasting data generated by said data generator includes identifier information and restart information of the access point.

18. The apparatus of claim 17, wherein the identifier information of the access point includes at least one of medium access control address information, Basic Service Set identifier information, and Extended Service Set identifier information of the access point.

19. The apparatus of claim 16, wherein said transceiver transmits a join response signal to said at least one wireless terminal over the wireless network when a join request signal is received from said at least one wireless terminal;
- said transceiver transmits a probe response signal to said at least one wireless terminal receiving the join response signal over the wireless network when a probe request signal is received from said at least one wireless terminal;
- said transceiver transmits a medium access control authentication response signal to said at least one wireless terminal receiving the probe response signal when a medium access control authentication signal is received from said at least one wireless terminal; and said transceiver transmits an association response signal in response to an association request signal when the association request signal is received from said at least one wireless terminal receiving the medium access control authentication response signal, and then provides the registration information for said at least one wireless terminal to said controller.

20. In a wireless terminal connected to an access point over a wireless network, an apparatus for detecting a restart of the access point, said apparatus comprising:

a controller for receiving a restart generation notification message transmitted as broadcast data from the access point over the wireless network, and responsive thereto for comparing and analyzing medium access control information of the access point contained in the received restart generation notification message to medium access control information of the access point reserved by said controller; and a transceiver for receiving the restart generation notification message transmitted as the broadcast data from the access point, and for transmitting terminal registration information for address resolution protocol registration to the access point over the wireless network when the medium access control information received from the access point and the medium access control information reserved by said controller match each other as a result of the comparing of the medium access control information by said controller.

21. The apparatus of claim 20, wherein the restart generation notification message transmitted from the access point includes identifier information and restart information for the access point.

22. The apparatus of claim 21, wherein the identifier information of the access point includes at least one of medium access control address information, Basic Service Set identifier information, and Extended Service Set identifier information of the access point.

23. The apparatus of claim 20, wherein said transceiver transmits a join request signal to the access point over the wireless network;

said transceiver transmits a probe request signal to the access point when a first response signal in response to the join request signal is received from the access point over the wireless network;

said transceiver transmits a medium access control authentication request signal to the access point when a second response signal in response to the probe request signal is received from the access point; and said transceiver transmits an association request signal to the access point and receives a third response signal in response to the association request signal when receiving, from the access point, a medium access control authentication response signal in response to the medium access control authentication request signal.

24. The apparatus of claim 20, wherein the restart generation notification message transmitted from the access point over the wireless network is included in a beacon signal, the beacon signal being periodically transmitted from the access point.

* * * * *